(12) United States Patent
Reggiori et al.

(10) Patent No.: US 12,414,589 B2
(45) Date of Patent: Sep. 16, 2025

(54) AEROSOL GENERATOR WITH DUAL BATTERY HEATING ARRANGEMENT (71) Applicant: PHILIP MORRIS PRODUCTS S.A., Neuchâtel (CH)

(72) Inventors: Riccardo Riva Reggiori, St-Sulpice (CH); Alexandra Sereda, Neuchâtel (CH); Serge Lopez, Prades (FR); Edward Branham, Neuchâtel (CH); Matthew Lawrenson, Chesterfield, MO (US)

(73) Assignee: Philip Morris Products S.A., Neuchâtel (CH)

( * ) Notice: Subject to any disclaimer, the term of this patent is extended or adjusted under 35 U.S.C. 154(b) by 281 days.

(21) Appl. No.: 18/006,271

(22) PCT Filed: Jul. 19, 2021

(86) PCT No.: PCT/IB2021/056512
§ 371 (c)(1),
(2) Date: Jan. 20, 2023

(87) PCT Pub. No.: WO2022/018616
PCT Pub. Date: Jan. 27, 2022

(65) Prior Publication Data
US 2023/0301365 A1    Sep. 28, 2023

(30) Foreign Application Priority Data
Jul. 21, 2020   (EP) ..................... 20186992

(51) Int. Cl.
A24F 47/00    (2020.01)
A24F 40/40    (2020.01)
(Continued)

(52) U.S. Cl.
CPC .............. *A24F 40/57* (2020.01); *A24F 40/40* (2020.01); *H01M 10/615* (2015.04);
(Continued)

(58) Field of Classification Search
CPC ... A24F 40/57; H01M 10/443; H01M 10/486; H01M 10/615; H01M 10/623; H01M 10/6571
See application file for complete search history.

(56) References Cited

U.S. PATENT DOCUMENTS 9,800,051 B2    10/2017   Laubenstein et al.
2012/0105010 A1   5/2012   Kinoshita

FOREIGN PATENT DOCUMENTS

EP          2978065 A1     1/2016
WO     WO 2018/001746 A1   1/2018
WO     WO 2019/037882 A1   2/2019

OTHER PUBLICATIONS

European Search Report for EP 20186992.2 issued by the European Patent Office on Dec. 18, 2020; 10 pgs.
(Continued)

*Primary Examiner* — Eric Yaary
(74) *Attorney, Agent, or Firm* — Mueting Raasch Group (57) ABSTRACT An aerosol-generating device (100) comprises a first power source (120), an aerosolizer (110) configured to receive power from the first power source and configured to generate aerosol from an aerosol-generating substrate (170), a second power source (130), and a heating circuit (160) configured to receive power from the second power source to heat the first power source.

20 Claims, 4 Drawing Sheets

(51) Int. Cl.
    *A24F 40/57*         (2020.01)
    *H01M 10/615*     (2014.01)
    *H01M 10/623*     (2014.01)
    *H01M 10/63*       (2014.01)
    *H01M 10/6571*   (2014.01)
    *H05B 1/02*        (2006.01)

(52) U.S. Cl.
    CPC ......... *H01M 10/623* (2015.04); *H01M 10/63* (2015.04); *H01M 10/6571* (2015.04); *H05B 1/0244* (2013.01); *H01M 2220/30* (2013.01)

(56) References Cited

OTHER PUBLICATIONS

International Search Report and Written Opinion for PCT/IB2021/056512, issued by the European Patent Office, Oct. 1, 2021; 15 pgs.
International Preliminary Report on Patentability for PCT/IB2021/056512, issued by the European Patent Office, Nov. 17, 2022; 15 pgs.

302 Heating second power source until above first temperature threshold

304 Heating first power source using second power source until above second temperature threshold

306 Using first power source to heat the aerosol-generating substrate

FIG. 5 ced on a substrate. Printing one or more
AEROSOL GENERATOR WITH DUAL BATTERY HEATING ARRANGEMENT This application is the § 371 U.S. National Stage of International Application No. PCT/IB2021/056512, filed 19 Jul. 2021, which claims the benefit of European Application No. 20186992.2, filed 21 Jul. 2020, the disclosures of which are incorporated herein by reference.

The present invention related to a method and device for aerosol generation. Some aerosol-generating devices include power sources.

Batteries are known and used as power sources for portable devices including aerosol-generating devices. Some batteries, such as lithium ion batteries, are capable of high storage capacity for longer operation of the aerosol-generating device.

According to an aspect of the present invention, there is provided an aerosol-generating device. The aerosol-generating device may include a first power source and a second power source. The aerosol-generating device may also include a heating circuit. The heating circuit may be configured to receive power from the first power source to heat the second power source in response to a temperature of the first power source or the second power source being below a first temperature threshold. The aerosol-generating device may also include an aerosolizer. The aerosolizer may be operably coupled to the first power source and configured to generate aerosol from an aerosol-generating substrate in response the temperature exceeding a second temperature threshold.

According to another aspect of the present invention, there is provided a method. The method may include detecting a temperature of a first power source or a second power source. The method may also include heating the second power source using a heating circuit receiving power from the first power source in response to the temperature being below a first temperature threshold. The method may further include generating aerosol from an aerosolizer using power from the first power source in response to the temperature exceeding a second temperature threshold.

The inclusion of at least one second power source in a device or method may facilitate high capacity operation at a wide range of temperatures, especially in a low temperature range in which a first power source may be ineffective. Use of the second power source may facilitate overall increased battery capacity during operation in the lower temperature range, for example, by using the first power source when properly heated or using the first power source for a short period of time while under a threshold temperature just to heat the second power source. Use of a second power source may also enable designs that facilitate faster heating of an aerosol-generating substrate in a low temperature range, for example, by bringing the first power source up to temperature more quickly or using the second power source to begin heating the aerosol-generating substrate before the first power source is brought to an appropriate temperature. Further, use of a second power source to heat the first power source in a low temperature range may facilitate increased longevity of the first power source.

In one or more aspects, the second power source may be sized and shaped to be heated faster than the first power source. In one example, the second power source may have a larger surface area per unit volume than the first power source. The larger surface area per unit volume may facilitate faster heating.

The first power source may have a cylindrical shape. The second power source may have a planar shape. In one example, the first power source, the second power source, or both may be formed as a thin film battery. In some examples, the first power source, the second power source, or both may be formed by printing onto a substrate. Printing one or more power sources onto a substrate may facilitate the ease of manufacturing compared to assembling multiple discrete power sources on a substrate.

In one or more aspects, the second power source may be removably coupled to the heating circuit. The removable coupling to the heating circuit may allow disposable, or replaceable, types of power sources to be used as the second power source.

In one or more aspects, the first power source may be non-removably coupled to the aerosolizer. The first power source may benefit from improved longevity by use of the second power source at low temperatures, which may allow for battery chemistries having more energy storage capacity to be used.

In one or more aspects, the heating circuit may be activated or the temperature of the first or second power source may be detected in response to motion detected by a motion sensor. Additionally, or alternatively, the heating circuit or the temperature of the first power source may be detected in response to turning on the aerosol-generating device.

In one or more aspects, the first power source may have a higher energy storage capacity than the second power source. The first power source may have a larger physical volume than the second power source.

In one or more aspects, the aerosol-generating device may include a heating circuit configured to heat one or both of the first and second power sources. In particular, the heating circuit may be configured to heat the second power source faster than the first power source.

In one or more aspects, the heating circuit may be configured to receive power from the first power source, the second power source, or both. Additionally, or alternatively, the aerosol-generating device may include a capacitor to store electrical energy, which may be used in addition to, or as an alternative to, providing power to the heating circuit to heat the first power source, the second power source, or both.

In one or more aspects, the second power source may be operably coupled to the aerosolizer to provide power to the aerosolizer when the temperature exceeds the first temperature threshold. The second power source may provide power to the aerosolizer until the temperature exceeds the second temperature threshold. The second temperature threshold may be higher than the first temperature threshold.

A controller of the aerosol-generating device may be configured to detect a temperature of the first power source, the second power source, or both. The controller may be operably coupled to one or more temperature sensors. The temperature sensor may be actively or passively powered.

In one or more aspects, the heating circuit may be configured to receive power from the first power source to heat the second power source when the temperature of the second power source is below the first temperature threshold. In particular, the temperature of the second power source may be compared to the first temperature threshold. In response to the temperature of the second power source exceeding the first temperature threshold, the heating circuit may be configured to receive power from the second power source to heat the first power source when the temperature of the first heating source is below the second temperature threshold. In particular, the temperature of the first power source may be compared to the second temperature threshold. After the temperature of the first power source exceeds the second temperature threshold, the first power source may be used to provide power to the aerosolizer. The second power source may also be recharged using the first power source.

Below, there is provided a non-exhaustive list of non-limiting examples. Any one or more of the features of these examples may be combined with any one or more features of another example, embodiment, or aspect described herein.

Example 1: An aerosol-generating device includes a first power source; a second power source; a heating circuit configured to receive power from the first power source to heat the second power source in response to a temperature of the first power source or the second power source being below a first temperature threshold; and an aerosolizer operably coupled to the first power source and configured to generate aerosol from an aerosol-generating substrate in response the temperature exceeding a second temperature threshold.

Example 2: A method includes detecting a temperature of a first power source or a second power source; heating the second power source using a heating circuit receiving power from the first power source in response to the temperature being below a first temperature threshold; and generating aerosol from an aerosolizer using power from the first power source in response to the temperature exceeding a second temperature threshold.

Example 3: The device or method of any preceding example, wherein the second power source is sized and shaped to be heated faster than the first power source.

Example 4: The device or method of any preceding example, wherein the second power source has a larger surface area per unit volume than the first power source.

Example 5: The device or method of any preceding example, wherein the first power source has a cylindrical shape.

Example 6: The device or method of any preceding example, wherein the second power source has a planar shape.

Example 7: The device or method of any preceding example, wherein the first power source or the second power source comprises a thin film battery.

Example 8: The device or method of any preceding example, wherein the first power source has a higher energy storage capacity than the second power source.

Example 9: The device or method of any preceding example, wherein the first power source has a larger volume than the second power source.

Example 10: The device or method of any preceding example, wherein the heating circuit is configured to heat the second power source faster than the first power source.

Example 11: The device or method of any preceding example, wherein the heating circuit is further configured to receive power from the first power source, the second power source, or both.

Example 12: The device or method of any preceding example, wherein the heating circuit is further configured to receive power from a capacitor to heat the first power source, the second power source, or both.

Example 13: The device or method of any preceding example, wherein the second power source provides power to the aerosolizer when the temperature exceeds the first temperature threshold.

Example 14: The device or method of example 13, wherein the second power source provides power to the aerosolizer until the temperature exceeds the second temperature threshold.

Example 15: The device or method of example 13 or 14, wherein the second power source is recharged using the first power source in response to the temperature exceeding the second temperature threshold.

Example 16: The device or method of any example 13 to 15, wherein the second temperature threshold is a higher temperature than the first temperature threshold.

Example 17: The device or method of any preceding example, further comprising a controller configured to detect a temperature of the first power source, the second power source, or both.

Example 18: The device or method of any preceding example, wherein a temperature of the second power source is compared to the first temperature threshold and a temperature of the first power source is compared to the second temperature threshold.

Example 19: The device or method of any preceding example, wherein the first power source or the second power source are formed by printing on a substrate.

Example 20: The device or method of any preceding example, wherein the second power source is removably coupled to the heating circuit.

Example 21: The device or method of any preceding example, wherein the first power source is non-removably coupled to the aerosolizer.

Example 22: The device or method of any preceding example, wherein the heating circuit is activated or the temperature is detected in response to motion detected by a motion sensor.

Example 23: The device or method of any example 1 to 21, wherein the heating circuit is activated or the temperature is detected in response to turning on the aerosol-generating device.

Examples will now be further described with reference to the figures in which.

The operation of lithium ion batteries may be problematic at low temperatures. In such low temperature conditions, both the battery capacity and voltage the battery can produce at its terminals may be reduced. Such a situation may render a device being powered by a lithium ion battery degraded or inoperable. For example, if a device comprising the battery is used when the battery's capacity is below a prescribed level (typically 5 or 10%), then the device may be configured to turn off, to protect the device against a situation where it is being used when its energy supply cease, which may leave it in an unrecoverable condition. Also, if the battery's voltage output drops below an expected level then the electronics it powers may not work, or may work in an erratic and unpredictable way. If the battery returns to a normal condition, then it may begin to operate as normal, however the device it is powering may need to be reset to allow it to resume normal operation. If an attempt is made to charge a lithium ion battery at low temperatures, however, this may lead to lithium being plated on the anode resulting in irreversible damage. Such damage may be cumulative over time and if continued, at some point the battery may be left inoperable. Therefore, it may be advantageous to maintain the battery at a higher temperature to allow it to operate at a preferred voltage and battery capacity, and also to allow it to be charged.

A lithium battery's capacity generally falls with temperature even at temperatures considered normal. For example, the capacity of a lithium ion battery may fall if the battery's temperature is reduced, even above 0° C. The reduction in capacity may become more pronounced as the temperature approaches 0° C. and may be considered significant below 0° C. Operation of a device may become problematic at such low temperature. In addition, charging of the battery may be detrimental to its longevity at such low temperatures depending on both the device and battery designs. For charging, typically temperatures above a range of 0° C. to 5° C. (dependent on battery design) may be considered to be normal, whilst below this level may be considered disadvantageously cold.

The present disclosure relates to returning a battery to an advantageous state by applying heating if a battery does enter a low temperature state. The heat may be applied by the device itself, allowing it to self-heat. Once the battery has returned to a higher temperature, the capacity may be also be returned to an advantageous state and the battery output may be returned to normal and may function in a more predictable manner.

During heating from a low temperature state, the battery may remain in a disadvantageous condition. This duration may be extended due to the form factor of the battery. For example, some batteries have a cylindrical form. Heat applied to the outer surface of such a battery may take some time to propagate to the inner volume of the battery. Thorough heating depending on the form of the battery may facilitate quicker heating. In one example, a full surface area of a flat battery may be positioned in proximity to a heater or heating circuit. However, such a flat battery form may not be practical for providing a high energy capacity within an aerosol-generating device compared to a cylindrical form.

The present disclosure relates to arranging the energy storage within an aerosol-generating device to fulfil both the requirement to quickly heat a battery to an operable temperature and also be able to store sufficient energy for multiple uses of the device.

FIG. 1 shows an aerosol-generating device 100 that may include various components to facilitate a dual battery heating arrangement for use in low temperatures. The aerosol-generating device 100 may include at least one or more of the following: an aerosolizer 110, a first power source 120, a second power source 130, a controller 140, an optional non-battery power source 150, a heating circuit 160, and an aerosol-generating substrate 170. The device 100 may also include one or more other components, such as a housing 105, a mouthpiece, an external device interface, an actuator, a communication interface, a display, a speaker, a switch, and a puff sensor. Although shown separately, in some embodiments, the aerosolizer 110 and the heating circuit 160 may be part of the same heating system. The first power source 120, the second power source 130, or both may be a battery. Each battery may be disposable or rechargeable.

As illustrated, the device may include at least two power sources, such as the first power source 120 and the second power source 130. Although only one of each power source is shown, two or more of each power source may also be provided.

The design of each power source may be optimized for a different purpose. The first power source 120 may be optimized for energy storage capacity. The second power source 130 may be optimized for rapid heating of the first power source 120. The second power source 130 may have a size, shape, and position in the device to facilitate rapid heating, whilst the first power source 120 may have a form to allow for storage of a large amount of energy efficiently. In one example, the second power source 130 may have a shape and placement within the device 100 to facilitate easier to heat rapidly, such as having a flat form with a large surface area in close proximity to the heating circuit 160. In some cases, this configuration may be used when the second power source 130 may be printed on the same substrate as other electronics of the device 100.

In one or more aspects, the first power source 120 may have a higher energy storage capacity than the second power source 130. The first power source 120 may have a larger physical volume than the second power source 130. In one example, the first power source 120 and the second power source 130 may have the same general shape but the first power source 120 may be larger than the second power source 130 and have a smaller surface area per unit volume than the second power source.

In one or more aspects, the second power source 130 may be configured to be heated faster than the first power source 120. The second power source 130 may be sized and shaped to facilitate faster heating compared to the first power source 120. In one example, the second power source 130 may have a larger surface area per unit volume than the first power source 120. The larger surface area per unit volume may facilitate faster heating.

The shape of the power source may be indicative of the surface area per unit volume. In one example, the first power source 120 may have a cylindrical shape. The second power source 130 may have a planar shape, such as a rectangular pyramid that is wide and deep but relatively thin. In one example, the first power source 120, the second power source 130, or both may be formed as a thin film battery. In some examples, the first power source 120, the second power source 130, or both may be formed by printing onto an electronics substrate. The non-battery power source 150 may also be printed onto the substrate. The substrate may be a printed circuit board (PCB) that may mechanically or electrically couple the first and second power sources to other components of the aerosol-generating device.

In one or more aspects, the aerosol-generating device 100 may include a heating circuit configured to heat one or both of the first and second power sources. In particular, the heating circuit may be configured to heat the second power source faster than the first power source. The heating circuit be thermally coupled to one or both of the first and second power sources. The heating circuit may be electrically coupled to one or both of the first and second power sources. In one example, the heating circuit may be directly thermally coupled to the second power source with a higher thermal conductivity than the thermal coupling to the first power source. In another example, the thermal conductivity between the heating circuit and the first and second power sources may be managed by a controller.

In some embodiments, in low temperatures, the device 100 may execute a process of heating the first power source 120 or the second power source 130 using the heating circuit 160, which may use energy from the first power source 120, the second power source 130, or another energy or power source 150, such as a capacitor or supercapacitor.

The second power source 130 may be designed for quick-heating. As such, the period of time to heat the second power source 130 to a particular temperature may be quicker than the first power source 120, even when subject to the same heating. The second power source 130 may also a shorter lifespan than the first power source 120 designed for energy storage. In some cases, the second power source 130 may be a replaceable power source (see FIG. 2).

In some embodiments, more than one power source may be included and used for one or both of the first power source or the second power source. In one example, a plurality of small power sources may be used. A small power source may be easily and quickly heated to arrive at a full capacity. The small power source may then generate heat, which may be used in part to allow use of the device or in part to heat another small power source. The heating of small power sources may be continued. In one example, a plurality of small power sources may be printed onto the electronics substrate. The small power sources may each represent a division or section of a larger power source. In one example, a single battery may be used for the first power source 120 and a plurality of small batteries may be used for the second power source 130.

Figure 1:
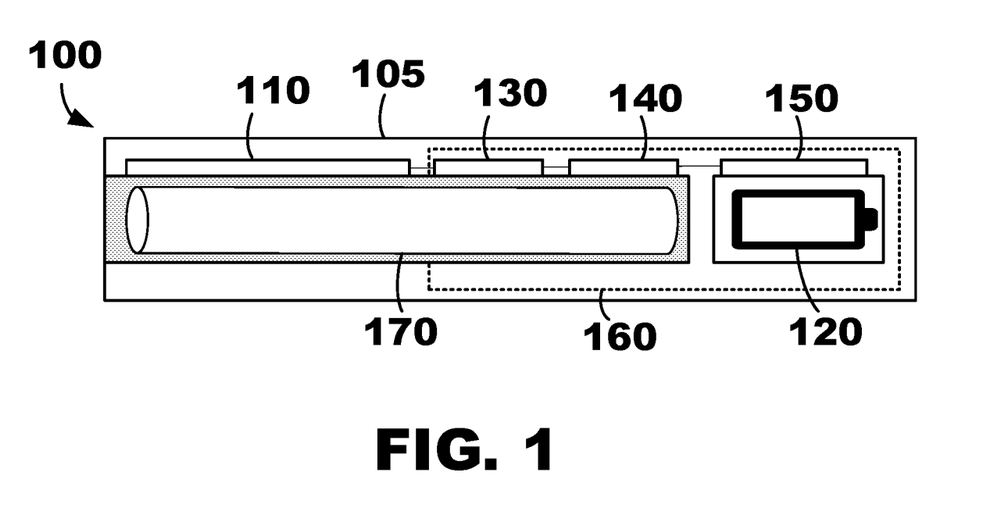
FIG. 1 shows a schematic diagram of one example of an aerosol-generating device having a dual battery heating arrangement.

The controller 140 of the aerosol-generating device 100 may be configured to detect a temperature of the first power source 120 or the second power source 130 individually, or at least detect a temperature indicative of the temperature of the first power source 120 and the second power source 130, such as an ambient temperature in proximity to either or both power sources. The controller 140 may be operably coupled to, or include, a temperature sensor used to detect such temperatures. The temperature sensor may be actively or passively powered.

In some embodiments, the heating of the first or second power source 120, 130 may be informed by one or more sensors of the device 100, such as a motion sensor or the temperature sensor that provides information that the device will soon be placed in cool conditions. For example, a motion sensor may detect that the device 100 has been taken out of a pocket or placed to the lips. In another example, a temperature sensor may detect an external temperature the device 100 is being subjected to and whether the device is being cooled. In such cases, heating of the first power source 120 by the heating circuit 160 may be performed to stop the first power source 120 from becoming cold and therefore exhibiting degraded performance.

In one or more aspects, the heating circuit 160 may be activated or the temperature may be detected in response to motion detected by the motion sensor. Additionally, or alternatively, the heating circuit 160 or the temperature of the first power source 120 may be detected in response to turning on the aerosol-generating device 100.

An aerosol-device charger may be external to the aerosol-generating device and removably couplable to the aerosol-generating device for charging the one or more of the power sources of the device 100. For example, the device 100 may include an external device interface, which may include a charging interface, that may operably couple to an interface of the charger. The charger may be portable, such that the user may hold and transport the aerosol-generating device coupled to the charger. One example of a charger is the IQOS charger sold by Philip Morris Products SA (Neuchâtel, Switzerland).

The housing 105 of the device 100 may be used to contain components. Some components may couple to the housing 105. The housing 105 may provide a size and shape suitable for being held by the hands of a user and for being puffed by the mouth of the user. The housing 105 may be integrally formed in one portion or may be removably coupled together as multiple portions. The aerosol-generating device may include a controller portion and a consumable portion. The housing 105 may be divided between the controller portion and the consumable portion. In general, the controller portion may include components that are not intended to be replaced, and the consumable portion may include components that are intended to be replaced over the useful live of the aerosol-generating device. For example, the controller portion may include the switch, the puff sensor, at least part of the aerosolizer 110, the heating circuit 160, the controller 140, the first power source 120, the second power source 130, the actuator, the communication interface, the display, or the speaker. The consumable portion, for example, may include the aerosol-generating substrate, part of the aerosolizer, and optionally the second power source 130. The controller and consumable portions may be permanently or removably coupled together. The consumable portion may be replaced in its entirety, or various components of the consumable portion may be removed and replaced. The consumable portion may also be described as a mouth portion and may include a mouthpiece to facilitate ease of puffing by the user.

The aerosol-generating substrate 170 may take any suitable form. For example, the substrate 170 may be solid or liquid. The substrate 170 may be contained in a substrate housing or cartridge, which may be coupled to the consumable portion of the housing. The aerosolizer 110 may be operably coupled to the aerosol-generating substrate 170 to generate aerosol when activated.

The aerosolizer 110 may be coupled to the housing 105 of the device 100. Part or all the aerosolizer 110 may be coupled to the consumable portion of the housing 105. Part or all the aerosolizer may be coupled to the controller portion of the housing 105.

The aerosolizer 110 may utilize any suitable technique for generating aerosol from the aerosol-generating substrate 170. In some cases, the aerosolizer 110 may be thermally or fluidly coupled to the aerosol-generating substrate 170. The aerosolizer 110 may be compatible for use with various types of aerosol-generating substrates.

The aerosolizer 110 may include a heater, a heater coil, a chemical heat source (such as a carbon heat source), or any suitable means that heats the substrate 170 to generate aerosol. The aerosolizer 110 may be coupled to the controller portion of the housing 105 to receive electrical power from the first or second power source 120, 130 and may be disposed adjacent to the substrate 170. For example, the aerosolizer 110 may be provided in the form of a heater, and the substrate 170 may be contained in the substrate housing. A heating element of the heater may be disposed adjacent to the substrate housing and heated to produce aerosol from a liquid or solid substrate. Part of the aerosolizer may also be coupled to the consumable portion of the housing 105. For example, a heater coil may include a susceptor coupled to the consumable portion and an inductive coil coupled to the controller portion configured to transfer energy to the susceptor for heating the substrate.

The aerosolizer 110 may include an atomizer. A liquid aerosol-generating substrate may be contained in the substrate housing and in fluid communication with the atomizer. The atomizer may mechanically generate aerosol from the liquid substrate.

The aerosolizer 110 may be compatible for use with an aerosol-generating substrate having a nicotine source and a lactic acid source. The nicotine source may include a sorption element, such as a polytetrafluoroethylene (PTFE) wick with nicotine adsorbed thereon, which may be inserted into a chamber forming a first compartment. The lactic acid source may include a sorption element, such as a PTFE wick, with lactic acid adsorbed thereon, which may be inserted into a chamber forming a second compartment. The aerosolizer 110 may include a heater to heat both the nicotine source and the lactic acid source. Then, the nicotine vapor may react with the lactic acid vapor in the gas phase to form an aerosol.

The switch may be coupled to the controller portion of the housing 105 and operably coupled to the controller 140. The switch may be disposed in or on the housing 105 to be accessible by the user. The switch may utilize any suitable mechanism to receive input from the user. For example, the switch may include a button or lever. In response to being pressed, toggled, or otherwise manipulated by the user, the switch may be activated or deactivated.

The switch may be associated with one or more functions. In particular, engagement of the switch may initiate various functionality of the aerosol-generating device 100. For example, the aerosolizer 110 may be activated in response to engagement of the switch. The switch may be engaged to power on (for example, activate) and released to power off (for example, deactivate) the aerosolizer 110 or other components.

In addition, or as an alternative to, the switch, a puff sensor may be operably coupled to the aerosolizer to activate the aerosolizer. The puff sensor may be operably coupled to the controller 140 of the aerosol-generating device 100. The puff sensor may detect an inhalation by the user on the mouthpiece of the consumable portion. The puff sensor may be positioned within an airflow channel in the aerosol-generating device to detect when a user inhales, or puffs, on the device 100. The puff may be detected by the controller 140 using the puff sensor. Non-limiting types of puff sensors may include one or more of a vibrating membrane, a piezoelectric sensor, a mesh-like membrane, a pressure sensor (for example, a capacitive pressure sensor), and an airflow switch.

The switch may be described as part of a user interface of the aerosol-generating device 100. The user interface may include any components that interact with any one of the user's senses, such as touch, sight, sound, taste, or smell.

The speaker may also be described as part of the user interface. The speaker may be coupled to the controller portion of the housing 105. The speaker may be disposed in or on the housing 105 such that audio generated by the speaker can be heard by the user. The speaker may be any size and type suitable for generating sound for a portable aerosol-generating device. The speaker may be simple and include a buzzer to produce one or more tones. The speaker may have higher fidelity than the buzzer and be capable of providing voice sounds or even music sounds.

The display may also be described as part of the user interface. The display may be coupled to the controller portion of the housing 105. The display may be disposed in or on the housing 105 such that the display is visible to the user. The display may be any size and type suitable for displaying visuals on a portable aerosol-generating device. The display may be simple and include a single light source, such as a light-emitting diode, to produce one or more pixels, or one or more colours. The display may have higher resolution than a single light source and may be able to display images.

The external device interface of the aerosol-generating device 100 may include the communication interface. The communication interface may be coupled to the controller portion of the housing 105. The communication interface may be disposed in or on the housing 105.

The communication interface may be operably coupled other devices and used to transfer data over a wired or wireless connection. The communication interface may connect to one or more networks. For example, the communication interface may connect to a low-power wide area network (LPWAN), such as those using technology from the Sigfox company or the LoRa Alliance organization.

The communication interface may operably couple to a remote user device. For example, the remote user device may be a smart phone, a tablet, or other device remote to the aerosol-generating device. The remote user device may include its own communication interface to connect to the aerosol-generating device. The communication interface of the aerosol-generating device may connect to the Internet directly or indirectly through a remote user device (for example, a smartphone) or through a network, such as the LPWAN.

The communication interface may include an antenna for wireless communication. A wireless communication interface may utilize a Bluetooth protocol, such as Bluetooth Low Energy. The communication interface may include a mini Universal Serial Bus (mini USB) port for wired communication. A wired communication interface may also be used as a power connection for charging.

Any suitable external power source may also be used to recharge the first power source, second power source, or even the capacitor. The external device interface may include the charging interface, which may be integrated with or separate from a wired communication interface, operably coupled to the first power source 120, the second power source 130, the non-battery power source 150, or any combination thereof. Each power source 120, 130, 150 may be coupled to the controller portion of the housing 105.

Each power source 120, 130, 150 may be disposed in or on the housing 105. Each power source 120, 130, 150 may be removably coupled to the housing 105 (intended to be replaced) or permanently coupled (intended to not be replaced). A permanent power source may also be described as non-removable or a non-removably coupled power source.

Each power source 120, 130, 150 may provide power to various components. Each power source 120, 130, 150 may be operably coupled to at least the aerosolizer 110. Each power source 120, 130, 150 may be operably coupled to the aerosolizer 110 using the controller 140.

In some embodiments, the first power source 120 may be operably coupled to the aerosolizer 110 to provide power. The first power source 120 may be operably coupled to the second power source 130 to charge the second power source or to the non-battery power source 150 to charge the non-battery power source. The first power source 120 may be operably coupled to the heating circuit 160 to provide power to heat one or more of the power sources. The second power source 120 may be operably coupled to the heating circuit 160 to provide power to heat one or more of the power sources. The non-battery power source 150 may be operably coupled to the heating circuit 160 to provide power to heat one or more of the power sources. The controller 140 may be operably coupled between any of the power sources and the heating circuit 160 to manage the source of power to the heating circuit 160.

Figure 2:
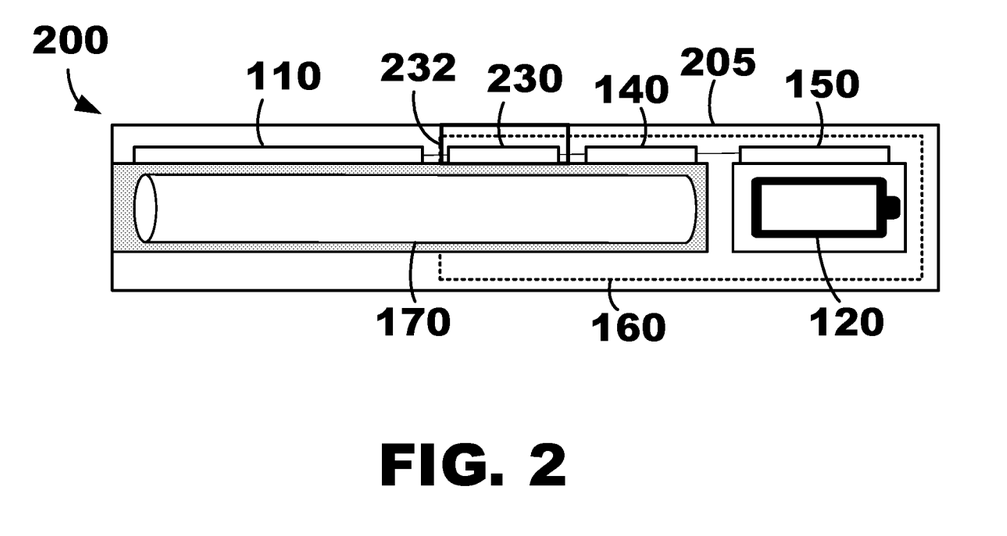
FIG. 2 shows a schematic diagram of another example of an aerosol-generating device.

FIG. 2 shows one example of an aerosol-generating device 200 including many of the same components as the device 100 of FIG. 1. The device 200 differs in that the second power source 230 may be removable and replaceable. In particular, the second power source 230 may be removably coupled to the heating circuit 160. Additionally, or alternatively, the second power source 230 may be removably coupled to the aerosolizer 110, the controller 140, the first power source 120, or even the non-battery power source 150. The second power source 230 may be received in a compartment 232 in the housing 205 of the device 200. The removable coupling to the heating circuit may allow disposable, or replaceable, types of power sources to be used as the second power source 130.

Figure 3:
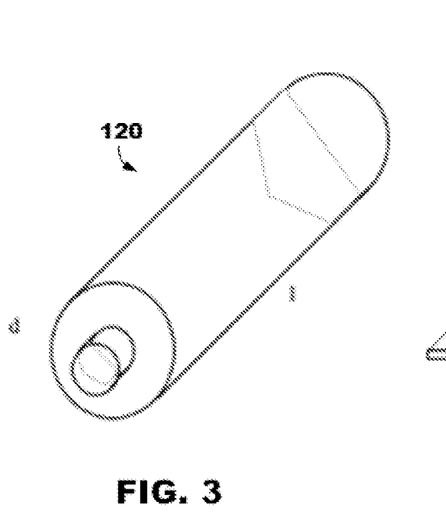
FIG. 3 shows a schematic diagram of one example of a first power source.
Figure 4:
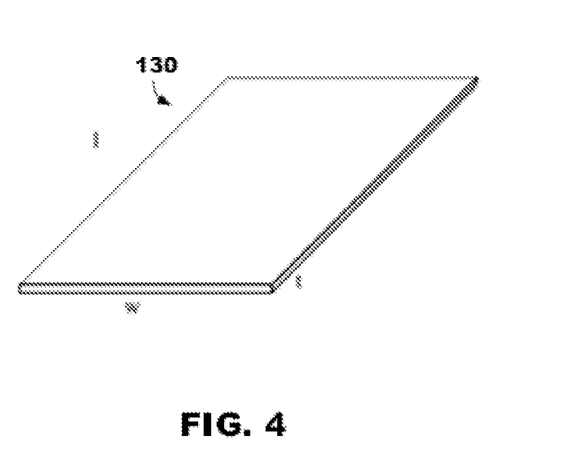
FIG. 4 shows a schematic diagram of one example of a second power source.

The shape of a power source may contribute to the speed of heating, particularly to a threshold temperature. FIG. 3 shows one example of the first power source 120 that may be used in the device 100 or the device 200 as a cylinder-shaped battery. FIG. 4 shows one example of the second power source 130 that may be used in the device 100 or the device 200 as a flat planar shaped battery. In general, speed of heat dissipation and the speed of heating of a power source is proportional to a surface area to volume ratio of the particular power source. The flat planar shape of the second power source 130 may be more suitable for rapid heating.

In some embodiments (not shown), the first power source 120 may be flat in shape (for example, similar to cell phone battery). The first power source 120 may be larger than the second power source 130, and therefore may consume more the energy to heat. The smaller second power source 130, even having the same shape as the first power source 120, may consume less energy to heat.

Figure 5:
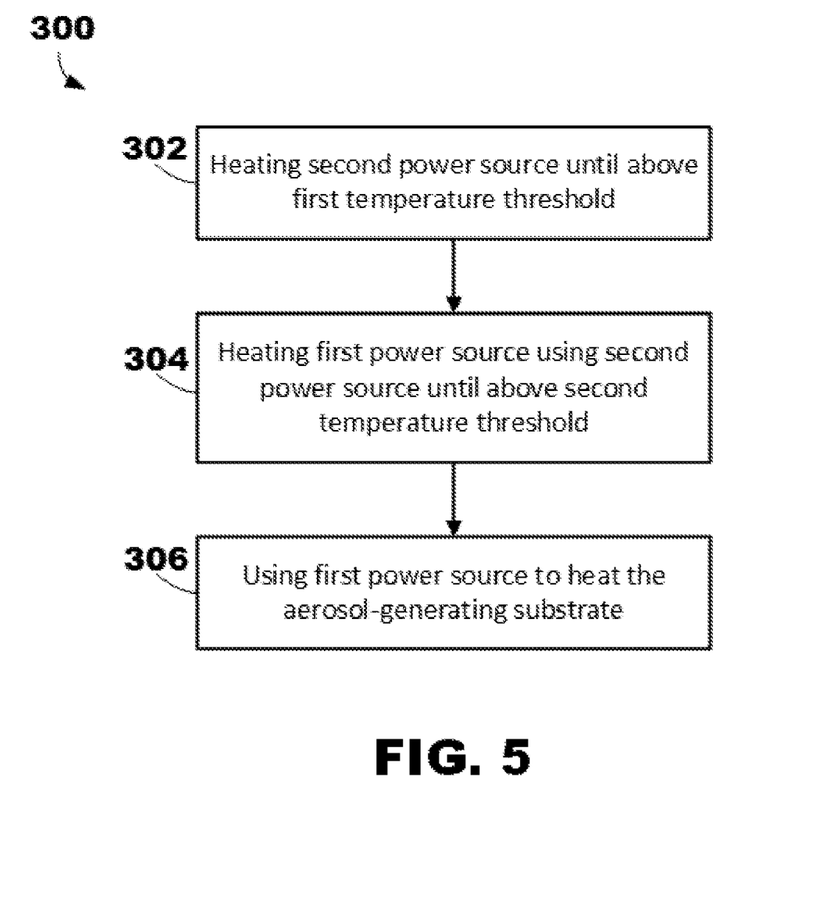
FIG. 5 shows a flow diagram of one example of a method of using a dual battery heating arrangement.

FIG. 5 shows on example of a method using a dual battery heating arrangement. The method 300 may include heating the second power source until the temperature exceeds a first temperature threshold in block 302. The temperature compared to the first temperature threshold may be indicative of the temperature of the second power source. The first temperature threshold may represent a minimum operating temperature for the second power source. The heating circuit may be used to heat the second power source. The heating circuit may be powered by the first power source, the second power source, or even a non-battery power source, such as a capacitor. In one example, the first power source having a larger capacity than the second power source may be used.

The method 300 may also include heating the first power source using the heating circuit powered by the second power source until the temperature exceeds a second temperature threshold in block 304. The temperature compared to the second temperature threshold may be indicative of the temperature of the first power source. The second temperature threshold may represent a minimum operating temperature for the first power source. In some cases, the second temperature threshold may be higher than the first temperature threshold.

In some cases, heating of individual power sources may be used. In other cases, the power sources may be heated together. Similarly, sensing the temperature of individual power sources may be used. In other cases, the temperature of the power sources may be represented by a single temperature measurement or value.

In some embodiments, the second power source may also be used to begin powering the aerosolizer before the temperature reaches the second temperature threshold, which may enable use of the aerosol-generating device. The powering of the aerosolizer and use of the aerosol-generating device may cause the temperature of the first power source to increase in addition to, or as an alternative to, powering the heating circuit to directly heat the first power source.

The method 300 may further include using the first power source to heat the aerosol-generating substrate in response to reaching the second temperature threshold in block 306. Optionally, the second power source may continue to be used to heat the aerosolizer concurrently with the first power source. In some cases, after the first power source reaches the second temperature threshold, the second power source may be recharged using the first power source to ready the second power source for a next use of the device.

The invention claimed is:

1. An aerosol-generating device comprising:
a housing;
a first power source disposed in or on the housing;
a second power source disposed in or on the housing;
a heating circuit configured to receive power from the first power source to heat the second power source in response to a temperature of the first power source or the second power source being below a first temperature threshold and to receive power from the second power source to heat the first power source in response to a temperature of the second power source exceeding the first temperature threshold when the temperature of the first power source is below a second temperature threshold; and
an aerosolizer operably coupled to the first power source and configured to generate aerosol from an aerosol-generating substrate in response the temperature of the first power source or the second power source exceeding a second temperature threshold.

2. The device of claim 1, wherein the second power source is sized and shaped to be heated faster than the first power source.

3. The device of claim 1, wherein the second power source has a larger surface area per unit volume than the first power source.

4. The device of claim 1, wherein the first power source has a higher energy storage capacity than the second power source.

5. The device of claim 1, wherein the first power source has a larger volume than the second power source.

6. The device of claim 1, wherein the heating circuit is configured to heat the second power source faster than the first power source.

7. The device of claim 1, wherein the heating circuit is further configured to receive power from a capacitor to heat the first power source, the second power source, or both.

8. The device of claim 1, wherein the second power source provides power to the aerosolizer when the temperature of the first power source or the second power source exceeds the first temperature threshold.

9. The device of claim 1, wherein the second power source provides power to the aerosolizer until the temperature of the first power source or the second power source exceeds the second temperature threshold.

10. The device of claim 1, wherein the second power source is recharged using the first power source in response to the temperature of the first power source or the second power source exceeding the second temperature threshold.

11. The device of claim 1, wherein the second temperature threshold is a higher temperature than the first temperature threshold.

12. The device of claim 1, further comprising a controller configured to detect the temperature of the first power source, the second power source, or both.

13. The device of claim 1, wherein a temperature of the second power source is compared to the first temperature threshold and a temperature of the first power source is compared to the second temperature threshold.

14. The device of claim 1, wherein the heating circuit is activated or the temperature of the first power source or the second power source is detected in response to turning on the aerosol-generating device.

15. A method comprising:
    detecting a temperature of a first power source or a second power source, wherein the first power source and the second power source are disposed in or on a housing;
    heating the second power source using a heating circuit receiving power from the first power source in response to the temperature of the first power source or the second power source being below a first temperature threshold;
    heating the first power source using the heating circuit receiving power from the second power source in response to the temperature of the second power source exceeding the first temperature threshold when the temperature of the first power source is below a second temperature threshold; and
    generating aerosol from an aerosolizer using power from the first power source in response to the temperature of the first power source or the second power source exceeding a second temperature threshold.

16. The method of claim 15, wherein the second power source is sized and shaped to be heated faster than the first power source.

17. The method of claim 15, wherein the first power source has a higher energy storage capacity than the second power source or the first power source has a larger volume than the second power source.

18. The method of claim 15, wherein the second temperature threshold is a higher temperature than the first temperature threshold.

19. An aerosol-generating device comprising:
    a housing;
    a first power source disposed in or on the housing;
    a second power source disposed in or on the housing;
    a heating circuit configured to receive power from the first power source to heat the second power source in response to a temperature of the first power source or the second power source being below a first temperature threshold; and
    an aerosolizer operably coupled to the first power source and configured to generate aerosol from an aerosol-generating substrate in response the temperature of the first power source or the second power source exceeding a second temperature threshold,
    wherein the second power source provides power to the aerosolizer when the temperature of the first power source or the second power source exceeds the first temperature threshold.

20. An aerosol-generating device comprising:
    a housing;
    a first power source disposed in or on the housing;
    a second power source disposed in or on the housing;
    a heating circuit configured to receive power from the first power source to heat the second power source in response to a temperature of the first power source or the second power source being below a first temperature threshold; and
    an aerosolizer operably coupled to the first power source and configured to generate aerosol from an aerosol-generating substrate in response the temperature of the first power source or the second power source exceeding a second temperature threshold,
    wherein the second power source provides power to the aerosolizer until the temperature of the first power source or the second power source exceeds the second temperature threshold.

* * * * *